US012485523B2

(12) United States Patent
Lu et al.

(10) Patent No.: US 12,485,523 B2
(45) Date of Patent: Dec. 2, 2025

(54) TORQUE OUTPUT TOOL

(71) Applicant: Nanjing Chervon Industry Co., Ltd., Nanjing (CN)

(72) Inventors: Wei Lu, Nanjing (CN); Di Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/467,508

(22) Filed: Sep. 14, 2023

(65) Prior Publication Data

US 2024/0001523 A1 Jan. 4, 2024

Related U.S. Application Data

(63) Continuation of application No. PCT/CN2022/079243, filed on Mar. 4, 2022.

(51) Int. Cl.

*B25F 5/00* (2006.01)
*B25B 21/00* (2006.01)
*B25F 5/02* (2006.01)

(52) U.S. Cl.

CPC .............. *B25F 5/001* (2013.01); *B25B 21/00* (2013.01); *B25F 5/02* (2013.01)

(58) Field of Classification Search

None

See application file for complete search history.

(56) References Cited

FOREIGN PATENT DOCUMENTS

| | | | |
|---|---|---|---|
| AU | 2013100077 | A4 | 2/2013 |
| CN | 104070490 | A | 10/2014 |
| CN | 105202064 | A * | 12/2015 |
| CN | 106393007 | A | 2/2017 |
| CN | 105437129 | A | 4/2017 |
| CN | 206795699 | U | 12/2017 |
| CN | 108789283 | A | 11/2018 |
| CN | 108145642 | A | 7/2022 |
| DE | 102016224226 | A1 | 6/2018 |
| EP | 1955818 | A2 | 1/2012 |

OTHER PUBLICATIONS

ISA/CN, International Search Report issued on PCT application No. PCT/CN2022/079243, dated Apr. 15, 2022, 4 pages.
ISA/CN, English translation of International Search Report issued on PCT application No. PCT/CN2022/079243, dated Apr. 15, 2022, 3 pages.
ISA/CN, Written Opinion issued on PCT application No. PCT/CN2022/079243, dated Apr. 15, 2022, 3 pages.
ISA/CN, English translation of Written Opinion issued on PCT application No. PCT/CN2022/079243, dated Apr. 15, 2022, 3 pages.

* cited by examiner

*Primary Examiner* — Tanzim Imam

(74) *Attorney, Agent, or Firm* — Greenberg Traurig, LLP

(57) ABSTRACT

A torque output tool includes a housing; an electric motor disposed in the housing; an output shaft capable of being connected to a working accessory and driving the working accessory to rotate; and a transmission assembly. The transmission assembly includes a drive wheel drivable by the electric motor to drive the output shaft to rotate about a first axis; a shaft lock ring disposed around the output shaft; and multiple locking posts disposed in the shaft lock ring and around the output shaft. The torque output tool further includes a spacer disposed between the drive wheel and the shaft lock ring and used for separating the locking posts from at least part of the drive wheel.

13 Claims, 8 Drawing Sheets

TORQUE OUTPUT TOOL

RELATED APPLICATION INFORMATION

This application is a continuation of International Application Number PCT/CN2022/079243, filed on Mar. 4, 2022, through which this application also claims the benefit under 35 U.S.C. § 119(a) of Chinese Patent Application No. 202110439981.X, filed on Apr. 23, 2021, which applications are incorporated herein by reference in their entirety.

TECHNICAL FIELD

The present application relates to a power tool and, in particular, to a torque output tool.

BACKGROUND

A torque output tool is provided with a transmission assembly for mounting and detaching an accessory, and a drive wheel, a shaft lock ring, and locking posts mate so that the locking posts move between a locking position and an unlocking position, so as to quickly mount or detach the accessory. The locking posts are in contact with the drive wheel. Due to a strength requirement in a design, a surface of the drive wheel in contact with the locking posts generally has pits, and thus the surface of the drive wheel in contact with end surfaces of the locking posts is non-planar. As a result, the locking posts are easily tilted relative to the drive wheel and thus cannot be accurately pushed to the corresponding locking position and unlocking position.

SUMMARY

A torque output tool including a housing; an electric motor disposed in the housing; an output shaft capable of being connected to a working accessory and driving the working accessory to rotate; and a transmission assembly. The transmission assembly includes a drive wheel drivable by the electric motor to drive the output shaft to rotate about a first axis; a shaft lock ring disposed around the output shaft; and multiple locking posts disposed in the shaft lock ring and around the output shaft. The torque output tool further includes a spacer disposed between the drive wheel and the shaft lock ring and used for separating the multiple locking posts from the drive wheel.

In one example, multiple toggle blocks are provided on a side of the drive wheel facing the multiple locking posts, where the multiple toggle blocks are disposed between the shaft lock ring and the output shaft.

In one example, the spacer includes a body portion and extension portions, where the body portion is an annular gasket having a through hole in the middle thereof, the extension portions extend towards the through hole, the number of extension portions is consistent with the number of locking posts, and the extension portions are capable of being in contact with the multiple locking posts.

In one example, an opening is formed between adjacent extension portions, and each of the multiple toggle blocks is inserted into the opening.

In one example, the multiple locking posts have at least a locking position and an unlocking position relative to the shaft lock ring, where when the multiple locking posts are at the locking position, the multiple locking posts lock a rotation of the output shaft relative to the housing, and when the multiple locking posts are at the unlocking position, the multiple locking posts release the rotation of the output shaft; and the multiple toggle blocks are toggled for switching the multiple locking posts between the locking position and the unlocking position.

In one example, the spacer is a gasket with a flat end surface.

In one example, the torque output tool further includes a gearbox including a first gearbox and a second gearbox, where the drive wheel and the shaft lock ring are disposed in the second gearbox. The transmission assembly further includes a first planetary gear train including first planet gears, a first planet carrier, and a first-stage internal ring gear, where the first planet gears are driven by the electric motor, the first planet carrier is used for mounting the first planet gears, and the first-stage internal ring gear meshes with the first planet gears; and a second planetary gear train including second planet gears and a second planet carrier, where the second planet carrier is used for mounting the second planet gears. The first gearbox is disposed at an end of the electric motor and supports the electric motor.

In one example, the transmission assembly further includes a positioning member supported by the first gearbox and positioning the first-stage internal ring gear in a direction of the first axis.

In one example, a dimension of the gearbox in a direction of the first axis is greater than or equal to 43 mm and less than or equal to 55 mm.

In one example, the second planetary gear train further includes a second-stage internal ring gear, and the transmission assembly further includes a third planetary gear train including third planet gears, the drive wheel, and a third-stage internal ring gear, where the drive wheel is used for mounting the third planet gears, the third-stage internal ring gear meshes with the third planet gears, and the drive wheel meshes with the output shaft.

DETAILED DESCRIPTION

Figure 1:
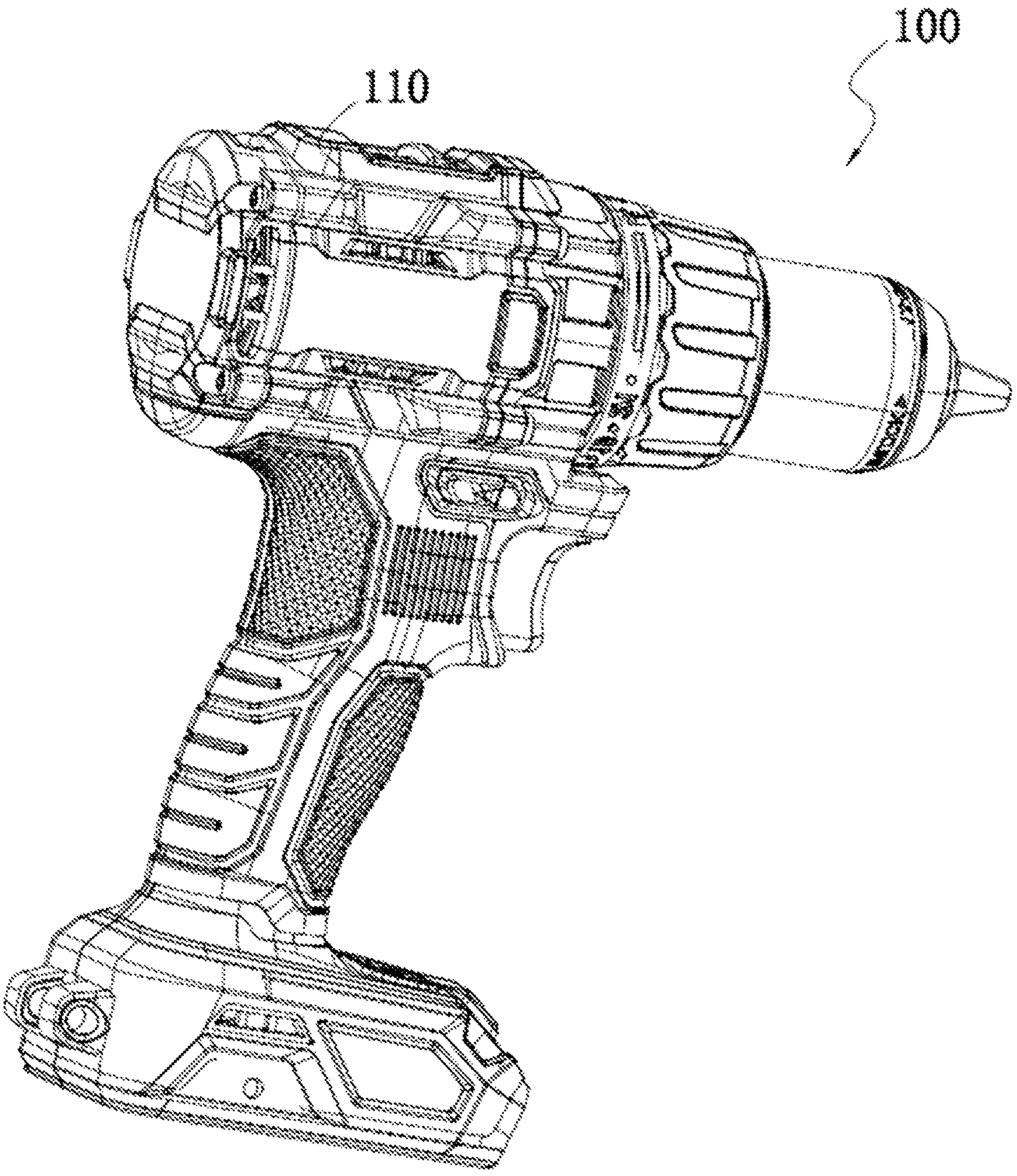
FIG. 1 is a perspective view of a torque output tool according to a first example of the present application.

Examples of the present application are described below in detail with reference to the drawings. The same or similar reference numerals indicate the same or similar elements or elements having the same or similar functions. The examples described below with reference to the drawings are exemplary and intended to explain the present application and cannot be construed as limiting the present application.

Technical solutions of the present application are further described below through the examples in conjunction with the drawings. A torque output tool 100 in a first example shown in FIG. 1 is a tool for torque output, which is a handheld power tool. The torque output tool 100 of the present application is an electric screwdriver, for example. The torque output tool 100 may be another tool capable of outputting torque, such as an electric drill or a tool having the functions of a screwdriver and an electric drill or may be another tool that converts torque into another form of motion.

Figure 2:
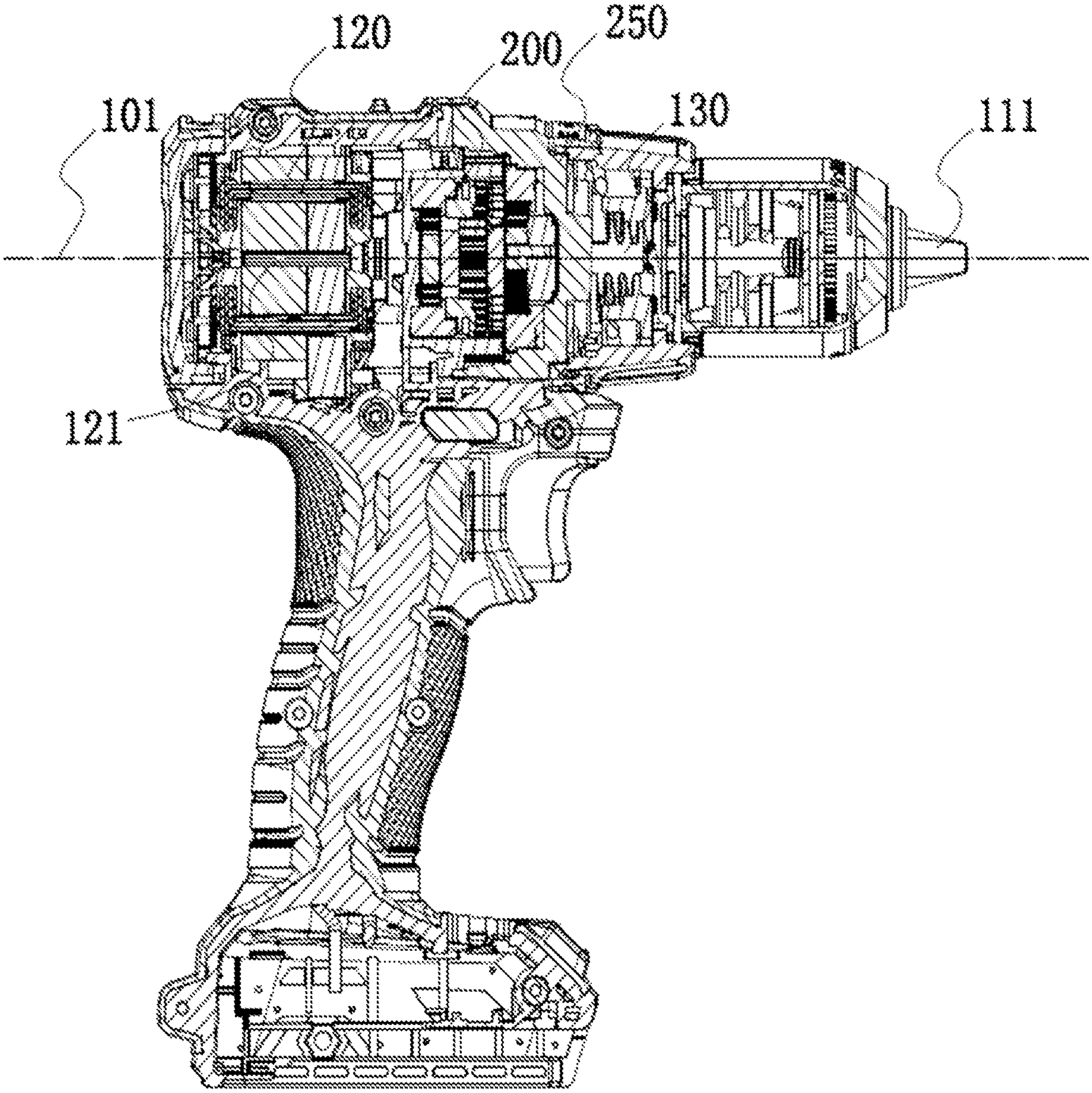
FIG. 2 is a sectional view of the torque output tool in FIG. 1.

Referring to FIG. 2, the torque output tool 100 may include a housing 110, an electric motor 120, a transmission assembly 200, and an output assembly, where the electric motor 120 is accommodated in the housing 110 and used for converting energy provided by an energy source into power and outputting the power to the transmission assembly 200, and the electric motor 120 includes a rotor shaft 121 that rotates about a first axis 101.

The transmission assembly 200 is disposed between the electric motor 120 and the output assembly and used for transmitting power between the electric motor 120 and the output assembly. The output assembly may directly output power to a workpiece to be machined. The output assembly may be connected to a tool accessory 111 and drive the workpiece through the tool accessory 111 to implement tool functions of the torque output tool 100. In this example, the output assembly includes an output shaft 130 and a working accessory 111 connected to the output shaft 130, the working accessory 111 may be a clamping device, the output shaft 130 is rotatable relative to the housing 110 about the first axis 101, and the clamping device is mounted onto the output shaft 130 and can rotate synchronously with the output shaft 130 to output power. For the electric screwdriver, the clamping device may clamp a bit.

Referring to FIGS. 3A to 5, the transmission assembly 200 includes a shaft lock ring 220, locking posts 230, and a drive wheel 210. The drive wheel 210 is sleeved on the output shaft 130 and rotates synchronously with the output shaft 130, and the output shaft 130 has a transmission portion mating with a drive hole 213, where the transmission portion is specifically an outer hexagonal portion. The shaft lock ring 220 is fixedly disposed in the housing 110 and cannot rotate relative to the housing 110. The shaft lock ring 220 surrounds and is sleeved on the output shaft 130, an accommodation space is formed between the shaft lock ring 220 and the output shaft 130, and the locking posts 230 are disposed in the accommodation space formed between the shaft lock ring 220 and the output shaft 130.

The drive wheel 210 includes a wheel body substantially having a disk-like structure. Toggle blocks 211 are formed on a side of the wheel body facing the locking posts 230 and disposed in the accommodation space between the shaft lock ring 220 and the output shaft 130. The wheel body of the drive wheel 210 is further formed with the drive hole 213, and the transmission portion of the output shaft 130 extends into the drive hole 213. In this example, the transmission portion of the output shaft 130 is the outer hexagonal portion, and the corresponding drive hole 213 is an octadecagonal hole capable of allowing the transmission portion to be in the drive hole 213 and rotate relative to the drive wheel 210 within a preset angle range. The specific structure of the drive hole 213 is not limited thereto as long as the structure of the drive hole 213 can allow the transmission portion to be in the drive hole 213 and rotate relative to the drive wheel 210 within the preset angle range, which is within the scope of the present application. The transmission portion of the output shaft 130 is not limited to the outer hexagonal portion and may be another transmission structure.

The locking posts have at least a locking position and an unlocking position relative to the shaft lock ring 220, where when the locking posts are at the locking position, the locking posts lock a rotation of the output shaft 130 relative to the housing 110, and when the locking posts are at the unlocking position, the locking posts release the rotation of the output shaft 130; and the toggle blocks 211 are toggled for switching the locking posts between the locking position and the unlocking position.

Figure 3A:
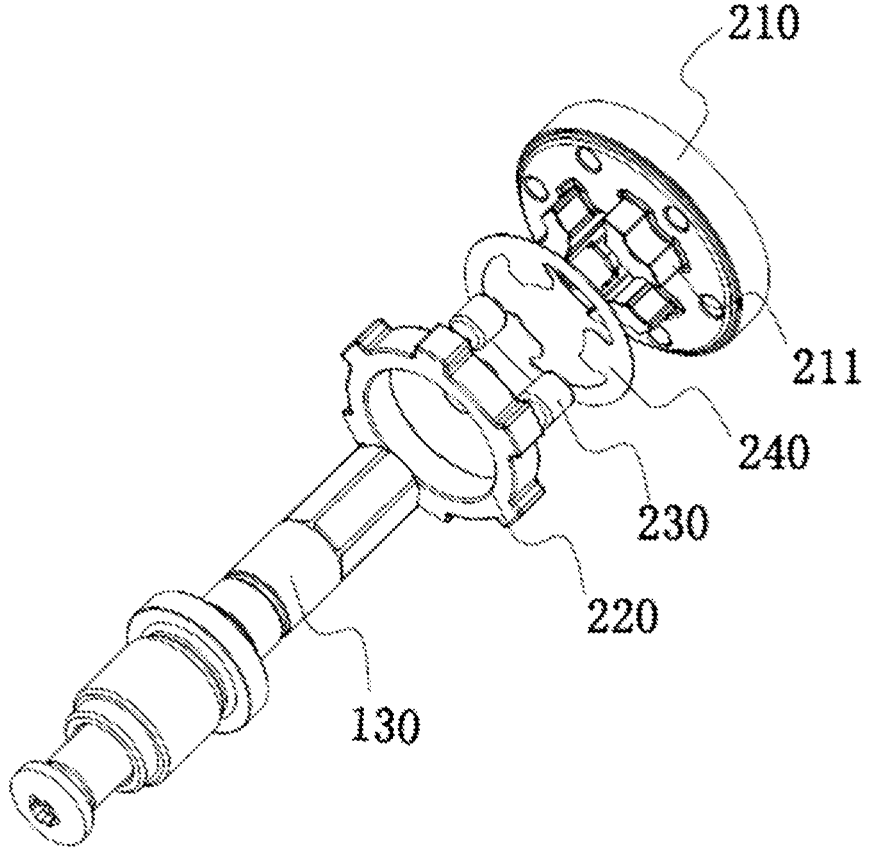
FIG. 3A is an exploded view of part of structures of a transmission assembly of the torque output tool in FIG. 1.
Figure 3B:
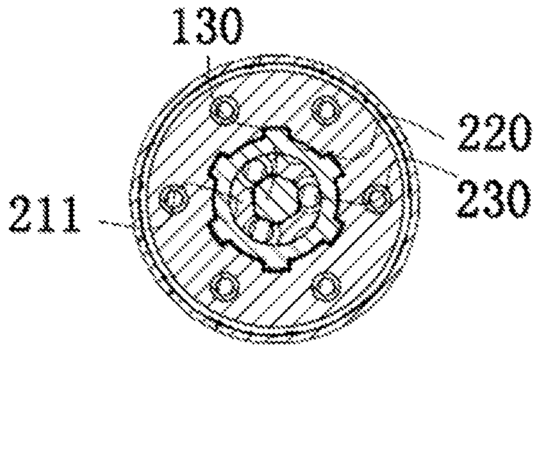
FIG. 3B is a sectional view illustrating that locking posts of a transmission assembly of the torque output tool in FIG. 1 are at an unlocking position.
Figure 3C:
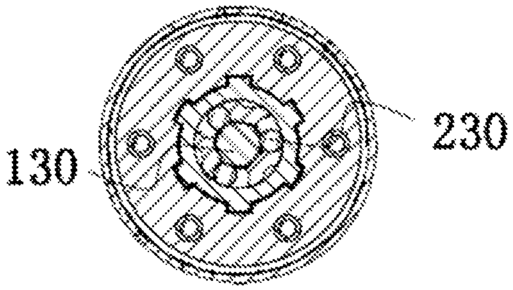
FIG. 3C is a sectional view illustrating that locking posts of a transmission assembly of the torque output tool in FIG. 1 are at a locking position.
Figure 4:
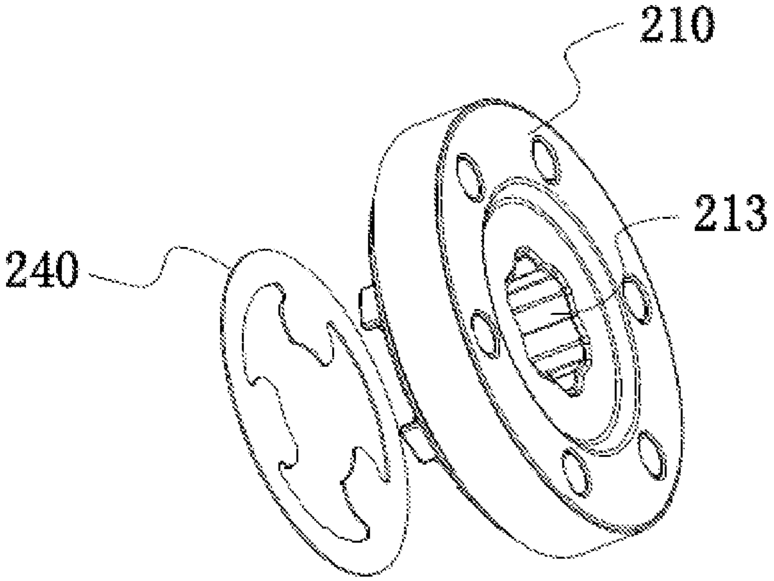
FIG. 4 is a structural view of a spacer and a drive wheel of the torque output tool in FIG. 1.
Figure 5:
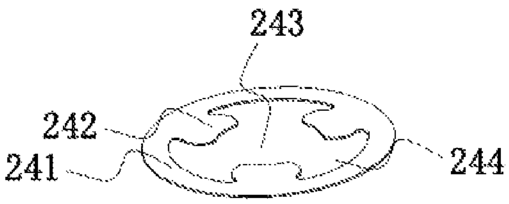
FIG. 5 is a structural view of a spacer of the torque output tool in FIG. 1.

The shaft lock ring 220 is formed with an inner wall surface centered on the first axis 101, and the inner wall surface surrounds the output shaft 130 to form the preceding accommodation space. The periphery of the output shaft 130 includes a first surface parallel to the first axis 101 and a second surface centered on the first axis 101. Each locking post 230 is a cylindrical pin disposed between the first surface and the inner wall surface. In this example, to improve stability, the number of first surfaces is 3, the number of second surfaces is also 3, and the first surfaces and the second surfaces are arranged alternately in sequence in a circumferential direction around the first axis 101. Accordingly, the number of locking posts is also 3, the number of toggle blocks 211 is also 3, and three toggle blocks 211 are each disposed between two adjacent locking posts to push the locking posts to move in the circumferential direction around the first axis 101. Referring to FIG. 3B, when the locking posts 230 are at the unlocking position, the locking posts 230 are not in contact with the inner wall surface and the first surfaces at the same time. At this time, the drive wheel 210 can drive the output shaft 130 to rotate relative to the housing 110 along a first direction. Referring to FIG. 3C, when the locking posts 230 are at the locking position, the locking posts 230 can be in contact with the inner wall surface and the first surfaces at the same time. At this time, the locking posts 230 are clamped in the circumferential direction around the first axis 101, and the rotation of the output shaft 130 relative to the housing 110 is locked so that a user cannot rotate the output shaft 130 relative to the housing 110 from the side of the output assembly, and the user can detach the clamping device.

The torque output tool 100 further includes a spacer 240 disposed between the drive wheel 210 and the shaft lock ring 220 and used for separating the locking posts 230 from at least part of the drive wheel 210. Meanwhile, the spacer 240 can separate at least part of the drive wheel 210 from the shaft lock ring 220. The drive wheel 210 includes a third surface on which the toggle blocks 211 are disposed, and the spacer 240 is configured to be in contact with the third surface. Since the drive wheel 210 has a relatively low hardness, if the drive wheel 210 and the shaft lock ring 220 are in direct contact and no spacer 240 is provided, the friction due to a relative motion between the drive wheel 210 and the shaft lock ring 220 causes the abrasion of an end surface of the drive wheel 210. The present application provides the spacer 240 between the drive wheel 210 and the shaft lock ring 220, thereby reducing the abrasion of the drive whee 1210, and the spacer 240 is disposed so that the locking posts 230 move more stably, thereby improving the overall performance of the torque output tool 100.

The spacer 240 includes a body portion 241 and extension portions 242, where the body portion 241 is an annular gasket having a through hole 243 in the middle thereof, the extension portions 242 extend towards the through hole 243 in the middle of the annular gasket, the number of extension portions 242 is consistent with the number of locking posts 230, and the extension portions 242 are capable of being in contact with the locking posts 230. The spacer 240 is attached to the third surface of the drive wheel 210 with the toggle blocks 211. Meanwhile, the other side of the spacer 240 opposite to the third surface abuts against the locking posts 230. Specifically, the extension portions 242 abut against the locking posts 230. The extension portions 242 are disposed between the toggle blocks 211 so that the toggle blocks 211 and the extension portions 242 are arranged alternately. An opening 244 is formed between adjacent extension portions 242, and each toggle block 211 is inserted into the opening 244. The through hole 243 matches the drive hole 213 in shape so that the output shaft 130 can penetrate through the through hole 243.

Since the toggle blocks 211 are disposed on the third surface of the drive wheel 210, the third surface of the drive wheel 210 often has trenches due to an effect of a technique and the strength requirement of the drive wheel 210 and thus is uneven. If no spacer 240 is provided, the locking posts 230 directly abut against the third surface. When the lock posts 230 are switched between the locking position and the unlocking position, the lock posts 230 are toggled by the toggle blocks 211 to move relative to the third surface, and the uneven third surface affects the movement process of the locking posts 230. Thus, the locking posts 230 are easily tilted relative to the drive wheel 210 and cannot be accurately pushed to the corresponding locking position and unlocking position, affecting the performance of the torque output tool 100. Therefore, the spacer 240 in this example has a flat surface and is a gasket having a flat end surface so that the surface for contact with the locking posts 230 is flat, thereby improving the stability of a transmission mechanism of a torque output device.

Figure 6:
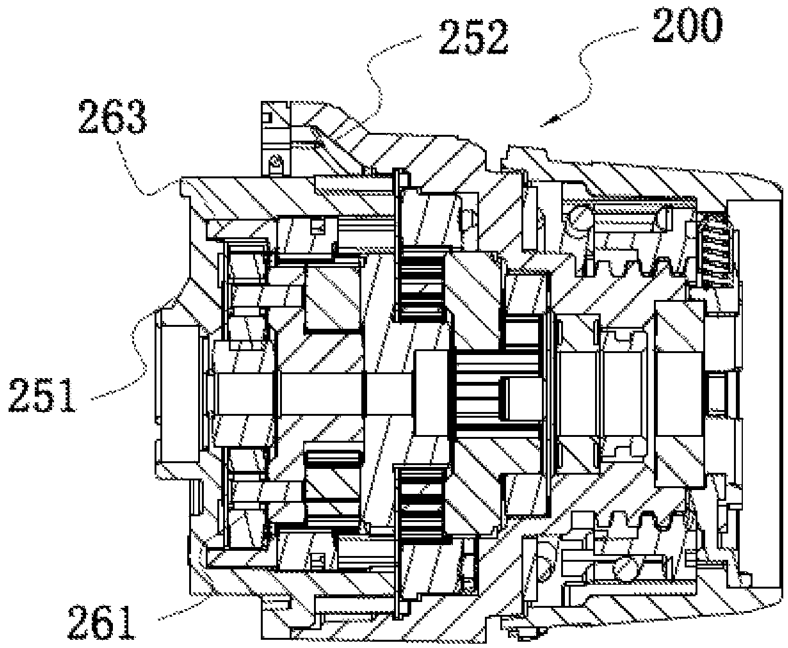
FIG. 6 is a sectional view of a transmission assembly of the torque output tool in FIG. 1.

Referring to FIG. 6, the transmission assembly 200 further includes a planetary gear train for deceleration, and the torque output tool 100 further includes a gearbox 250 including a first gearbox 251 and a second gearbox 252, where at least part of the planetary gear train is disposed in the first gearbox 251, and the shaft lock ring 220, the drive wheel 210, and the locking posts 230 are disposed in the second gearbox 252. A one-stage or multi-stage planetary gear train may be provided, and a three-stage planetary gear train is used as an example for describing the specific structures of this example below.

Figure 7:
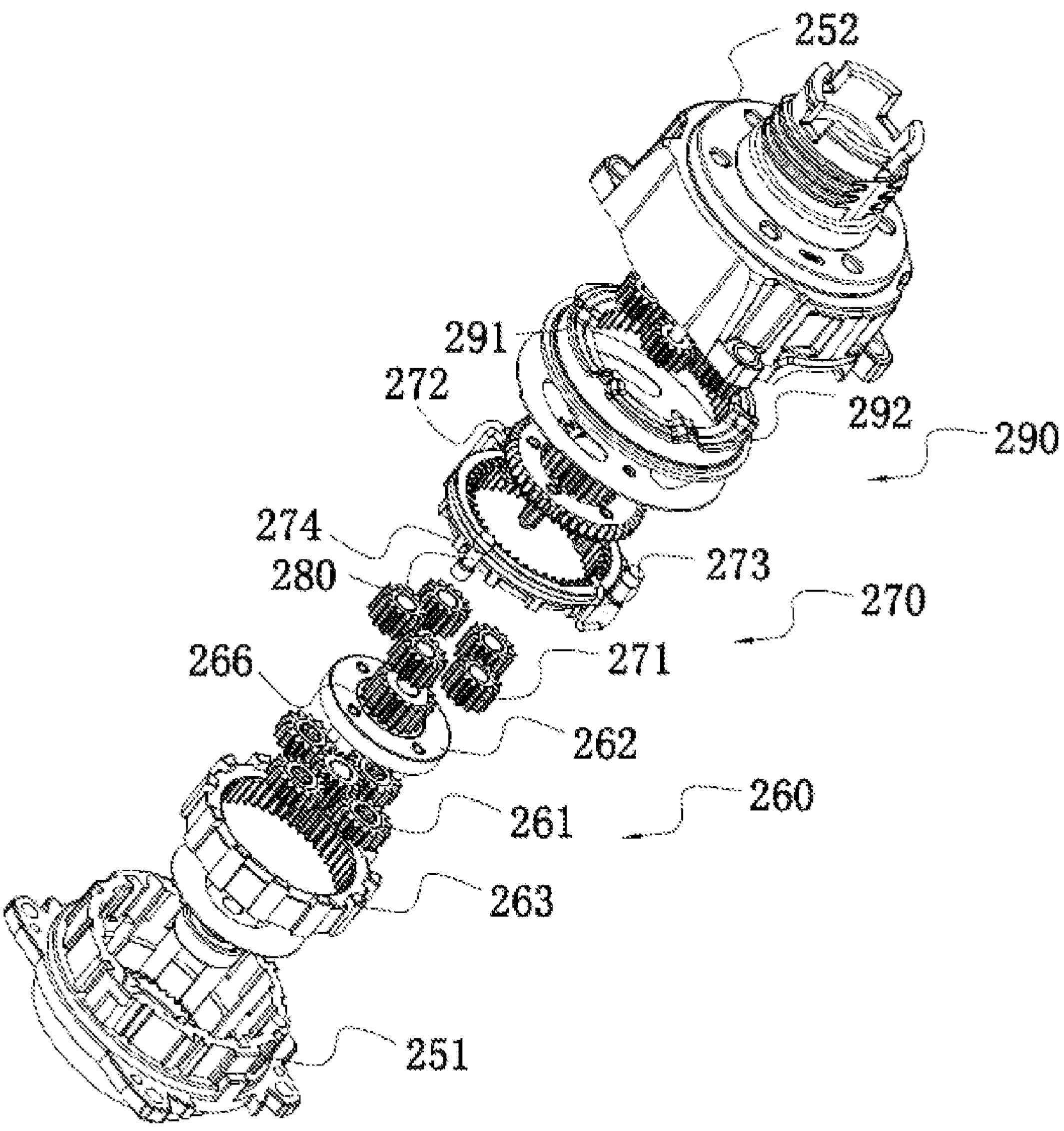
FIG. 7 is an exploded view of part of a transmission assembly of the torque output tool in FIG. 1.
Figure 8:
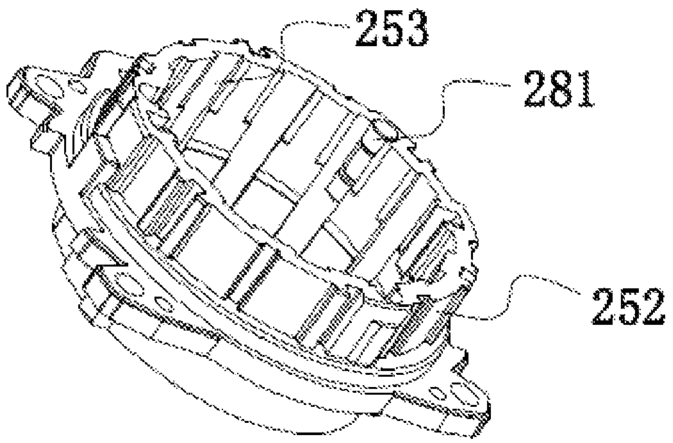
FIG. 8 is a schematic view of a first gearbox of the torque output tool in FIG. 1.
Figure 9:
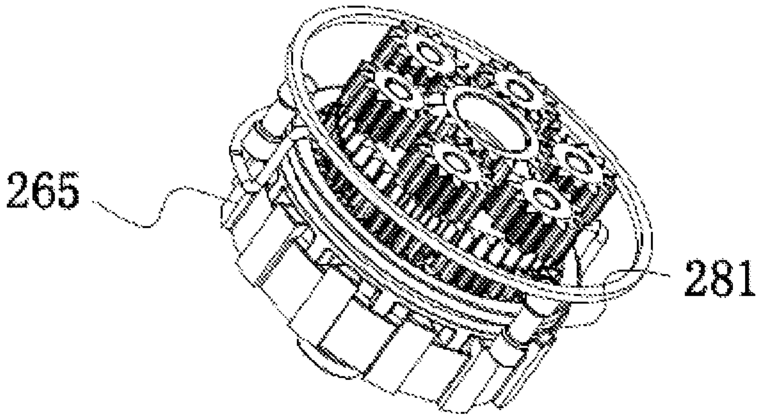
FIG. 9 is a schematic view of a positioning member limiting a first-stage internal ring gear of the torque output tool in FIG. 1.

Referring to FIGS. 6 and 7, the transmission assembly 200 includes a first planetary gear train 260, a second planetary gear train 270, and a third planetary gear train 290, where the first planetary gear train 260 includes first planet gears 261 and a first planet carrier 262, and the second planetary gear train 270 includes second planet gears 271 and a second planet carrier 272. The transmission assembly 200 includes a sun gear connected to the electric motor 120 and driven by the electric motor 120 to rotate. The first planet gears 261 are configured to mesh with the sun gear. The third planetary gear train 290 includes third planet gears 291, the drive wheel 210, and a third-stage internal ring gear 292, where the drive wheel 210 is used for mounting the third planet gears 291, and the drive wheel 210 meshes with the output shaft 130. The third-stage internal ring gear 292 meshes with the third planet gears 291; and the second planetary gear train 270 is disposed between the first planetary gear train 260 and the third planetary gear train 290.

The first gearbox 251 includes a front end and a rear end, the gearbox 250 is disposed at an end of the electric motor 120, and the rear end of the first gearbox 251 supports the rotor shaft 121 of the electric motor 120. The front end of the first gearbox 251 is open and communicates with the inside of the second gearbox 252.

Referring to FIGS. 6 to 9, the transmission assembly 200 further includes a first-stage internal ring gear 263 disposed in the housing 110, where the first-stage internal ring gear 263 meshes with the first planet gears 261. Multiple first planet gears 261 are provided, the multiple first planet gears 261 are configured to mesh with the sun gear, and the electric motor 120 drives, through the sun gear, the first planet gears 261 to rotate. The sun gear and the first planet gears 261 form meshing teeth for power transmission. The diameter of an addendum circle of the sun gear is configured to be less than the diameter of an addendum circle of each first planet gear 261 so that the number of meshing teeth of the first planet gear 261 is greater than the number of meshing teeth of the sun gear.

The first planet carrier 262 includes a transmission disc, a support frame, and a first output portion 266, where the support frame and the first output portion 266 are formed on two sides of the transmission disc separately, and the support frame is inserted into the first planet gears 261 and rotatably connected to the first planet gears 261 so that the first planet gears 261 can drive the first planet carrier 262 to rotate about the first axis 101 during operation. Meshing teeth are formed on the circumferential side of each of the transmission disc and the first output portion 266, and the first output portion 266 meshes with the second planetary gear train 270 so that the first planetary gear train 260 and the second planetary gear train 270 are drivingly connected.

Multiple second planet gears 271 are provided and form external engagement with the first output portion 266, that is, the first output portion 266 of the first planetary gear train 260 forms a sun gear for the second planet gears 271. The transmission assembly 200 further includes a second-stage internal ring gear 273, where internal teeth are formed on the inner circumference of the second-stage internal ring gear 273. The second-stage internal ring gear 273 is connected to the second planet gears 271 in a meshing manner. The second planet gears 271 are rotatably connected to the second planet carrier 272. The second planet carrier 272 is formed with a second output portion connected to the output shaft 130, the output shaft 130 includes a flat portion 264 mating with the second output portion, and part of the output shaft 130 is placed in the second output portion so that the output shaft 130 and the second output portion rotate synchronously.

The second-stage internal ring gear 273 meshes with the second planet gears 271, the second-stage internal ring gear 273 includes multiple first locking teeth 274, and the transmission assembly further includes a switching member including second locking teeth mating with the first locking teeth 274. The switching member may move to at least a first position and a second position. When the switching member is at the first position, the second locking teeth and the second-stage internal ring gear are staggered in the circumferential direction around the first axis 101. When the switching member is at the second position, the second locking teeth and the first locking teeth 274 are disengaged in the circumferential direction around the first axis 101. When the switching member is at the first position, the second locking teeth abut against the first locking teeth 274 to limit a rotation of the second-stage internal ring gear 273, that is, the second-stage internal ring gear 273 cannot rotate relative to the first gearbox 251 about the first axis 101 at this time. In this case, the second planetary gear train implements the function of deceleration, and the transmission assembly 200 outputs a first gear ratio as a whole. When the switching member is moved to the second position, the second locking teeth no longer abut against the first locking teeth 274 so that the second-stage internal ring gear 273 can rotate relative to the first gearbox 251, the second-stage internal ring gear 273 and the second planet gears 271 rotate synchronously, and the second planetary gear train does not implement the function of deceleration. In this case, the transmission assembly 200 outputs a second gear ratio as a whole, where the first gear ratio is greater than the second gear ratio.

The switching member may be a ring provided with the second locking teeth. The switching member is formed with a mating portion mating with the first gearbox 251 so that the housing 110 mates with the mating portion of the switching member to prevent the switching member from rotating relative to the housing 110. The switching member is fixed to the first gearbox 251 and can move to the first position and the second position relative to the first gearbox 251.

The torque output tool 100 further includes a positioning member 280 supported by the first gearbox 251 and positioning the first-stage internal ring gear 263 in a direction of the first axis 101. A positioning pin 281 extends along the direction of the first axis 101, that is, extends along an axial direction of the first axis 101 or along an axial direction parallel to the first axis 101. The positioning member 280 mates with the first gearbox 251 to together position the first axis 101, and the first gearbox 251 does not need to position the first-stage internal ring gear 263 alone so that the front end of the first gearbox 251 can be open, so as to reduce a dimension of the first gearbox 251.

The gearbox 250 is further formed with a mounting slot 253, where the mounting slot 253 extends along the axial direction of the first axis 101, the first-stage internal ring gear 263 further includes a protruding block, and the protruding block can be placed into the mounting slot 253 to limit the first-stage internal ring gear 263 so that the first-stage internal ring gear 263 cannot rotate relative to the first gearbox 251.

Optionally, the positioning member 280 is the positioning pin 281, and the positioning pin 281 extends along the axial direction of the first axis 101. The positioning pin 281 is disposed in the mounting slot 253 formed by the first gearbox 251, the transmission assembly 200 further includes a gasket, an end of the positioning pin 281 abuts against the gasket, and the other end of the positioning pin 281 abuts against the first-stage internal ring gear 263 so that the first-stage internal ring gear 263 is clamped by the positioning pin 281 and the first gearbox 251. The positioning pin 281 abuts against a protruding block 265. The positioning pin 281 extends along the axial direction of the first axis 101 and may not increase the diameter of the first gearbox 251 along a radial direction of the first axis 101 so that the diameter of the gearbox 250 at the first-stage internal ring gear 263 is less than or equal to 46 mm and greater than or equal to 40 mm. Meanwhile, since the structure of the first gearbox 251 is simplified, a dimension of the gearbox 250 in the axial direction of the first axis 101 is greater than or equal to 43 mm and less than or equal to 55 mm.

Figure 10:
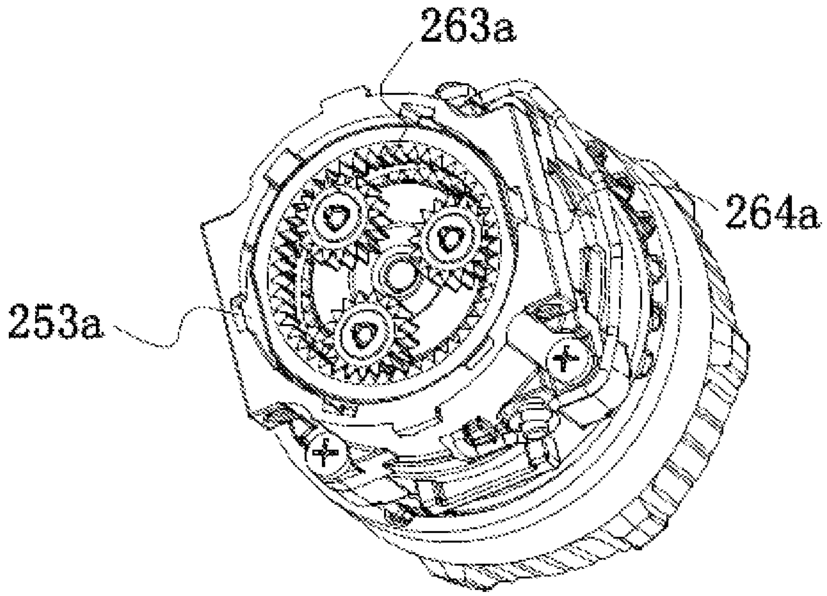
FIG. 10 is a perspective view of a transmission assembly of a torque output tool according to a second example of the present application.
Figure 11:
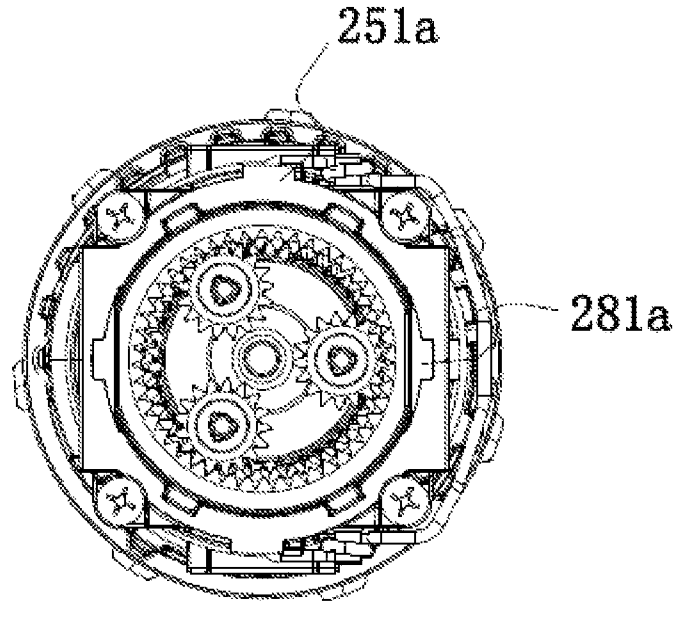
FIG. 11 is a plan view of the transmission assembly of the torque output tool in FIG. 10.

In an example, referring to FIGS. 10 and 11, the positioning member is a positioning pin 281*a*, the positioning pin 281*a* extends along the radial direction of the first axis, a first gearbox 251*a* is formed with a mounting slot 253*a*, and the positioning pin 281*a* is placed within the mounting slot 253*a* and mates with the first gearbox 251*a* to position a first-stage internal ring gear 263*a*. The first-stage internal ring gear 263*a* is formed with a flat portion 264*a*, and the positioning pin 281*a* is disposed between the mounting slot 253*a* and the flat portion 264*a*. The positioning pin 281*a* is in contact with the flat portion 264*a* of the first-stage internal ring gear 263*a*, the first-stage internal ring gear 263*a* further includes a protruding block that can be placed into the mounting slot 253*a* to limit the first-stage internal ring gear 263*a*, and the positioning pin 281*a* abuts against the protruding block at the same time.

What is claimed is:

1. A torque output tool, comprising:
a housing;
an electric motor disposed in the housing;
an output shaft capable of being connected to a working accessory and driving the working accessory to rotate; and
a transmission assembly comprising:
a drive wheel drivable by the electric motor to drive the output shaft to rotate about a first axis;
a shaft lock ring disposed around the output shaft; and
a plurality of locking posts disposed in the shaft lock ring and around the output shaft,
wherein the torque output tool further comprises:
a spacer disposed between the drive wheel and the shaft lock ring and used for separating the plurality of locking posts from at least part of the drive wheel; and
a gearbox comprising a first gearbox and a second gearbox, wherein the drive wheel and the shaft lock ring are disposed in the second gearbox,
wherein the transmission assembly further comprises:
a first planetary gear train comprising first planet gears, a first planet carrier, and a first-stage internal ring gear, wherein the first planet gears are driven by the electric motor, the first planet carrier is used for mounting the first planet gears, and the first-stage internal ring gear meshes with the first planet gears; and
a second planetary gear train comprising second planet gears and a second planet carrier, wherein the second planet carrier is used for mounting the second planet gears and the first gearbox is disposed at an end of the electric motor and supports the electric motor.

2. The torque output tool of claim 1, wherein a plurality of toggle blocks are provided on a side of the drive wheel facing the plurality of locking posts, and the plurality of toggle blocks are disposed between the shaft lock ring and the output shaft.

3. The torque output tool of claim 2, wherein the spacer comprises a body portion and extension portions, the body portion is an annular gasket having a through hole in a middle thereof, the extension portions extend towards the through hole, a number of the extension portions is consistent with a number of the plurality of locking posts, and the extension portions are capable of being in contact with the plurality of locking posts.

4. The torque output tool of claim 3, wherein an opening is formed between adjacent extension portions, and one of the plurality of toggle blocks is inserted into the opening.

5. The torque output tool of claim 2, wherein the plurality of locking posts have at least a locking position and an unlocking position relative to the shaft lock ring, when the plurality of locking posts are at the locking position, the plurality of locking posts lock a rotation of the output shaft relative to the housing, when the plurality of locking posts are at the unlocking position, the plurality of locking posts release the rotation of the output shaft, and the plurality of toggle blocks are toggled for switching the plurality of locking posts between the locking position and the unlocking position.

6. The torque output tool of claim 1, wherein the spacer is a gasket with a flat end surface.

7. The torque output tool of claim 1, wherein the transmission assembly further comprises a positioning member supported by the first gearbox and positioning the first-stage internal ring gear in a direction of the first axis.

8. The torque output tool of claim 1, wherein a dimension of the gearbox in a direction of the first axis is greater than or equal to 43 mm and less than or equal to 55 mm.

9. The torque output tool of claim 1, wherein the second planetary gear train further comprises a second-stage internal ring gear, the transmission assembly further comprises a third planetary gear train comprising third planet gears, the drive wheel, and a third-stage internal ring gear, the drive wheel is used for mounting the third planet gears, the third-stage internal ring gear meshes with the third planet gears, and the drive wheel meshes with the output shaft.

10. The torque output tool of claim 6, wherein the drive wheel comprises a wheel body, a plurality of toggle blocks are provided on a side of the wheel body facing the plurality of locking posts, and the gasket is disposed between the wheel body and the plurality of locking posts in a direction of the first axis.

11. The torque output tool of claim 10, wherein a side of the gasket is in contact with the wheel body and an opposite side of the gasket is in contact with the plurality of locking posts.

12. A torque output tool, comprising:

a housing;

an electric motor disposed in the housing;

an output shaft capable of being connected to a working accessory and driving the working accessory to rotate; and a transmission assembly comprising:

a drive wheel drivable by the electric motor to drive the output shaft to rotate about a first axis;

a shaft lock ring disposed around the output shaft; and a plurality of locking posts disposed in the shaft lock ring and around the output shaft, wherein the torque output tool further comprises:

a spacer disposed between the drive wheel and the shaft lock ring and used for separating the plurality of locking posts from at least part of the drive wheel, wherein the drive wheel comprises a wheel body and a plurality of toggle blocks formed on a surface of the wheel body facing the plurality of locking posts, and the spacer is configured to be in contact with the surface of the wheel body.

13. The torque output tool of claim 12, wherein the spacer comprises a body portion and extension portions, the body portion is an annular gasket having a through hole in a middle thereof, and the extension portions extend towards the through hole in the middle of the annular gasket.

* * * * *